United States Patent Office 3,264,883
Patented August 9, 1966

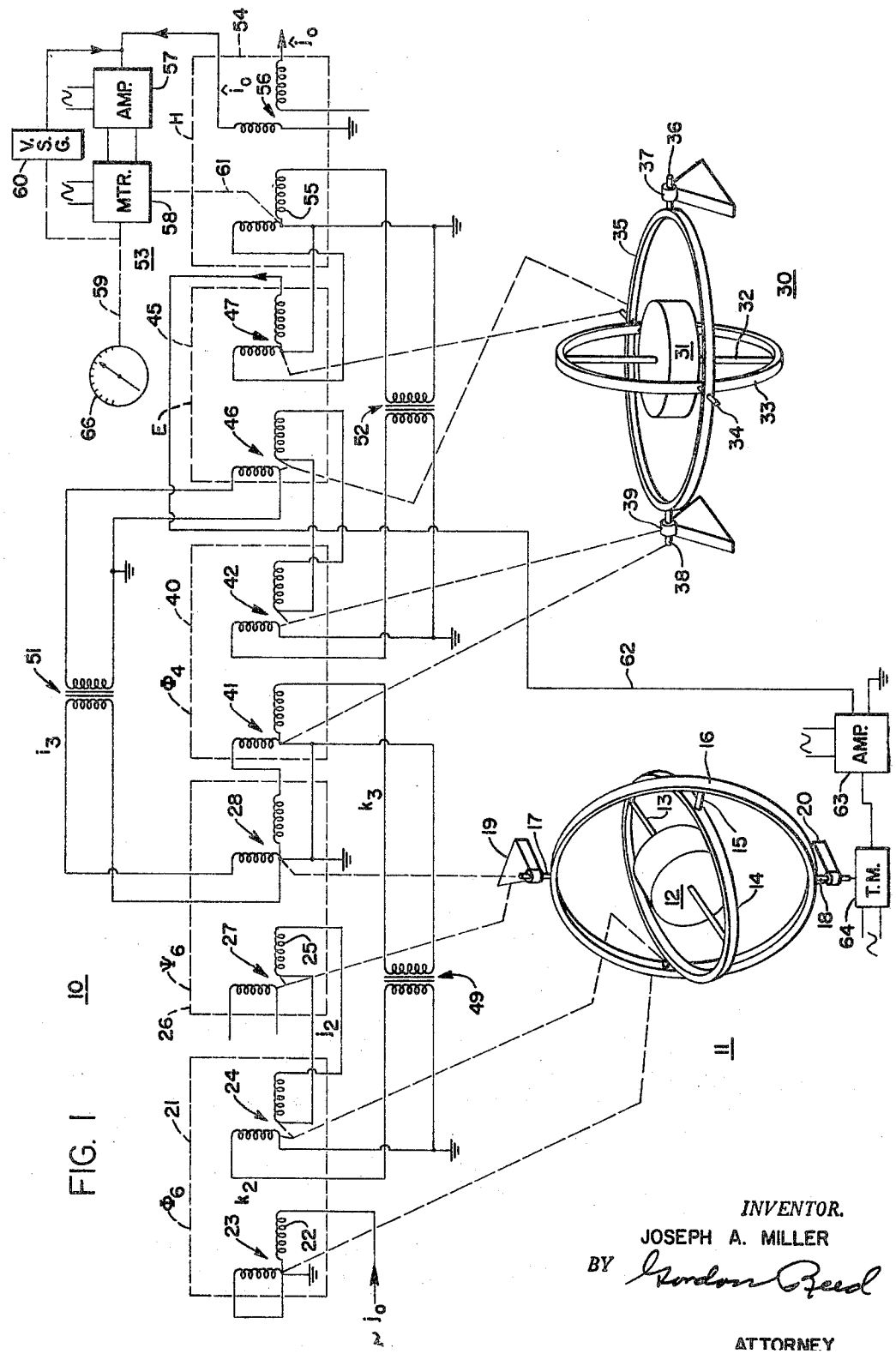

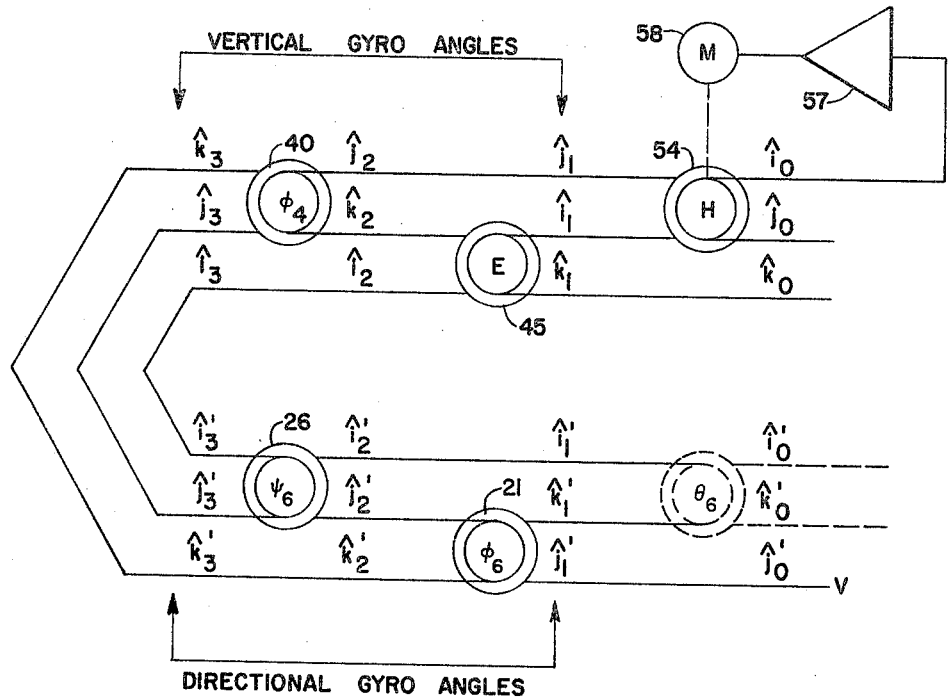

3,264,883
CONTROL APPARATUS
Joseph A. Miller, Stillwater, Minn., assignor to Honeywell Inc., a corporation of Delaware
Filed Aug. 2, 1960, Ser. No. 46,984
18 Claims. (Cl. 74—5.34)

The present invention relates to directional systems or course indicators and more particularly to an arrangement of existing compass controlled directional gyro reference systems.

The invention is more intimately concerned with an all attitude flight reference system which supplies information to define the attitude of an earth bound vehicle and may be used to direct the flight path thereof.

The all attitude reference system comprises an all attitude vertical gyroscope and an all attitude directional gyroscope. Prior directional reference systems, utilizing both a directional gyroscope and a vertical gyroscope or a vertical gyroscope and compass sought to obtain a correct directional reference system by physically mounting the directional gyroscope or the compass on a vertical gyroscope, or on a gimballed repeater which was driven by a vertical gyro.

An object of the present invention is to provide an improved directional reference while independently and separately mounting both the vertical gyroscope and directional gyroscope but including novel electrical connections between the vertical gyroscope and directional gyroscope to provide a correct directional reference.

It is a further object of this invention to provide both a precise heading reference and roll and pitch attitude references. Other and additional objects of the invention and advantages thereof, will be better understood on reference to the accompanying drawings which represent an improved all attitude directional reference system according to this invention.

In the drawing:

FIGURE 1 is an electrical schematic of the two gyro reference systems and their electrical interconnections;

FIGURE 2 shows the arrangement in simplified functional diagram form.

The present system is characterized by its simplicity, uniqueness of approach, and economy. The simplicity of the system is illustrated by a functional diagram and electrical schematic of FIGURES 2 and 1 respectively. The uniqueness and simplicity of this mechanization are achieved through the use of synchro resolvers on the gimbals of the directional gyro and on the position repeaters of the vertical gyro to perform the matrix computation of the space-fixed attitude defining vectors.

The theoretical basis for the approach to the unique mechanization of FIGURE 1 of the all attitude reference system depends upon two basic principals:

(1) A directional gyro because of its angular momentum and its two angular degrees of freedom can completely describe the direction of a vector in space which lies along its spin axis.

(2) The direction of a vector in space is unique regardless of the Euler angles used to describe it.

The system makes use of the first principal by obtaining the direction of the directional gyro spin axis in the aircraft body axes such as X and Z.

The second principle is used when this same spin axis vector is transformed from the body axes of the aircraft back into inertial axes through the Euler angles of the vertical gyroscope. There is only one unique value of heading or course for which this transformation will give the proper inertial vector, and the heading repeater servo will seek out this heading angle.

The operation of the all attitude directional reference system is described with reference to FIGURE 2, remembering that the axes of the aircraft may be considered a coordinate axis reference system which can be described in part either by a vertical gyroscope gimbal angles or directional gyro gimbal angles and the axes of the vertical gyroscope may be considered a second coordinate reference system. A unit vector or vector of unit length in space coordinates as seen by the directional gyroscope is assumed. This vector is taken equal to $j_0=1$, $i_0=0$, $k_0=0$, and is represented in a physical structure by the voltage V. Since the directional gyro is only a two-axis device and has no capability to sense rotation ($\theta 6$) about its spin axis, the unit vector direction is chosen in the gyro rotor spin axis ($j_0$) so that its magnitude in aircraft coordinates will be unaffected by a rotation $\theta_6$ about this axis.

This vector is resolved into aircraft coordinates X, Y, and Z through the Euler angles of rotation which are defined by the direction gyro as $\theta_6$, $\phi_6$, and $\Psi_6$. Angles $\theta_6$, $\phi_6$ and $\Psi_6$ are notations for the Euler angles of a gyro which sense pitch, roll and yaw from inner axis outward. This vector is then further resolved back to space coordinates through the Euler angles $\phi$ and E of the vertical gyro.

The third rotation through the Euler angle (H) is not defined by the vertical gyro since this represents a rotation about its spin axis. Therefore, the third rotation is made through a computed space referenced heading angle (H). If this computed space referenced heading angle is, in fact, the true space referenced heading of the aircraft, the unit vector ($j_0$) will be a maximum and the unit vector ($i_0$) will be a minimum. Since it is easier and more accurate to detect a null signal than a maximum signal, $i_0$ is used to control the heading repeater. In effect, then, a unit vector has been rotated through one set of Euler angles relating the directional gyro and aircraft and rotated back through another set of Euler angles relating the aircraft and vertical gyro to its original base reference. If the direction of the resultant vector is equal to the direction of the original vector, the Euler angles describing it must be correct and heading is properly defined. A mathematical treatise on these vectors is given later.

The system accomplishes the transformation $j_0$ to aircraft coordinates by means of sine-cosine resolvers mounted directly in the directional gyroscope. The transformation of $j_0$ back into earth coordinates is done through resolvers mounted in the repeaters. The pitch and roll repeaters are driven by the vertical gyro in the conventional manner, and the heading repeater is driven by $i_0$.

The following is a definition of terms and a mathematical derivation of the heading error equation:

$S_0(\hat{i}_0, \hat{j}_0, \hat{k}_0)$ Space fixed coordinates
$S_3(\hat{i}_3, \hat{j}_3, \hat{k}_3)$ Aircraft coordinates $S_H \equiv \sin H$, ie. by definition
$C_H \equiv \cos H$ H—First rotation about $\hat{k}_0, \hat{k}_1,$ ⎫ Vertical gyro Euler
E—Second rotation about $\hat{j}_1, \hat{j}_2$ ⎬ angles based on rotor spin, pitch axis, and roll axis of the
$\phi$—Third rotation about $\hat{i}_2, \hat{i}_3$ ⎭ vertical gyro.

$\theta_6$—First rotation about $\hat{j}'_0, \hat{j}'_1$ ⎫ Directional gyro Euler
$\phi_6$—Second rotation about $\hat{i}'_1, \hat{i}'_2$ ⎬ angles based on pitch, roll, yaw axes of directional
$\psi_6$—Third rotation about $\hat{k}'_2, \hat{k}'_3$ ⎭ gyro.

Yaw, pitch, roll H, E, $\phi$ (vertical gyro)

$$[M_4] = \begin{bmatrix} (C_E C_H) & (-C_\phi S_H + S_\phi S_E C_H) & (S_\phi S_H + C_\phi S_E C_H) \\ (C_E S_H) & (C_\phi C_H + S_\phi S_E S_H) & (-S_\phi C_H + C_\phi S_E S_H) \\ (-S_E) & (S_\phi C_E) & (C_\phi C_E) \end{bmatrix}$$

Inverse matrix pitch, roll yaw $\theta_6$, $\phi_6$, $\psi_6$ (directional gyro).

$$[M_6]^t \begin{bmatrix} (C_{\psi 6} C_{\theta 6} + S_{\psi 6} S_{\phi 6} S_{\theta 6}) & (S_{\psi 6} C_{\phi 6}) & (-C_{\psi 6} S_{\theta 6} + S_{\psi 6} S_{\phi 6} C_{\theta 6}) \\ (-S_{\psi 6} C_{\psi 6} + C_{\psi 6} S_{\phi 6} S_{\theta 6}) & (C_{\psi 6} C_{\phi 6}) & (S_{\psi 6} S_{\theta 6} + C_{\psi 6} S_{\phi 6} C_{\theta 6}) \\ (C_{\phi 6} S_{\theta 6}) & (-S_{\phi 6}) & (C_{\phi 6} C_{\theta 6}) \end{bmatrix}$$

It is possible to change coordinates from $S_0$ to $S_3$ through directional gyro Euler angles by means of the transformation $[M_6]^t$: Wherein $a_{11}$, $a_{12}$, $a_{13}$ etc. are the above quantities in parenthesis.

$$[M_6]^t \begin{bmatrix} \hat{i}'_0 \\ \hat{j}'_0 \\ \hat{k}'_0 \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} \hat{i}'_0 \\ \hat{j}'_0 \\ \hat{k}'_0 \end{bmatrix} = \begin{bmatrix} \hat{i}'_3 \\ \hat{j}'_3 \\ \hat{k}'_3 \end{bmatrix} \text{ Directional gyro cosine matrix}$$

Similarly, it is possible to change from $S_3$ to $S_0$ through vertical gyro Euler angles by means of transformation matrix $[M_4]$:

$$[M_4] \begin{bmatrix} \hat{i}_3 \\ \hat{j}_3 \\ \hat{k}_3 \end{bmatrix} = \begin{bmatrix} b_{11} b_{12} b_{13} \\ b_{21} b_{22} b_{23} \\ b_{31} b_{32} b_{33} \end{bmatrix} \begin{bmatrix} \hat{i}_3 \\ \hat{j}_3 \\ \hat{k}_3 \end{bmatrix} = \begin{bmatrix} \hat{i}_0 \\ \hat{j}_0 \\ \hat{k}_0 \end{bmatrix} \text{ Vertical gyro cosine matrix}$$

By recognizing that $\hat{i}'_3$, $\hat{j}'_3$, $\hat{k}'_3$, are equal to $\hat{i}_3$, $\hat{j}_3$, $\hat{k}_3$, respectively, it is possible to obtain, by substitution, the transformation which exists between $\hat{i}'_0$, and $\hat{i}_0$.

$$\begin{bmatrix} b_{11} b_{12} b_{13} \\ b_{21} b_{22} b_{23} \\ b_{31} b_{32} b_{33} \end{bmatrix} \begin{bmatrix} a_{11} a_{12} a_{13} \\ a_{21} a_{22} a_{23} \\ a_{31} a_{32} a_{33} \end{bmatrix} \begin{bmatrix} \hat{i}_0 \\ \hat{j}_0 \\ \hat{k}_0 \end{bmatrix} = \begin{bmatrix} \hat{i}_0 \\ \hat{j}_0 \\ \hat{k}_0 \end{bmatrix} \text{ By substitution}$$

By inspection of $[M_6]^t$, it is apparent that the only horizontal vector that can be described by the directional gyro independently of $\theta_6$ (which is not known) is $\hat{j}'_0$.

Therefore, let $$\hat{i}'_0 = \hat{k}'_0 = 0 \quad \text{and} \quad \hat{j}'_0 = \hat{j}'_0$$

Then $$\hat{i}_0 = (b_{11} a_{12} + b_{12} a_{22} + b_{13} a_{32}) \hat{j}'_0$$

$$= [(C_E C_H) S_{\psi 6} C_{\phi 6} + (-C_\phi S_H + S_\phi S_E C_H) C_{\psi 6} C_{\phi 6} + (S_\phi S_H + C_\phi S_E S_H)(-S_{\phi 6})] \hat{j}'_0$$

$$= [C_H (C_E S_{\psi 6} C_{\phi 6} + S_\phi S_E C_{\psi 6} C_\phi - C_\phi S_E S_{\phi 6}) - S_H (C_\phi C_{\psi 6} C_{\phi 6} + S_\phi S_{\phi 6})] \hat{j}'_0$$

and $$\hat{j}_0 = (b_{21} a_{12} + b_{22} a_{22} + b_{23} a_{32}) \hat{j}'_0$$

$$= [(C_E S_H) S_{\psi 6} C_{\phi 6} + C_\phi C_H + S_\phi S_E S_H) C_{\psi 6} C_{\phi 6} + (-S_\phi C_H + C_\phi S_E S_H)(-S_{\phi 6})] \hat{j}'_0$$

$$= \left[ C_H \underbrace{(C_\phi C_{\psi 6} C_{\phi 6} + S_\phi S_{\phi 6})}_{S_{H_1}} + S_H \underbrace{(C_E S_{\psi 6} C_{\phi 6} + S_\phi S_E C_{\psi 6} C_{\phi 6} - C_\phi S_E S_{\phi 6})}_{C_{H_1}} \right] \hat{j}'_0$$

The use of $S_{H_1}$ and $C_{H_1}$ is justifiable since the matrix from which these terms were obtained is known to be orthogonal.

Then, $$\hat{i}_0 = (C_H C_{H_1} - S_H S_{H_1}) \hat{j}'_0 = \cos(H + H_1) \hat{j}'_0$$

$$\hat{j}_0 = (S_H C_{H_1} + C_H S_{H_1}) \hat{j}'_0 = \sin(H + H_1) \hat{j}'_0$$

When $$\hat{i}_0 = 0, \quad H + H_1 = 90$$

Therefore, $$\hat{j}_0 = \hat{j}'_0$$

and both conditions for the correct value of H have been satisfied. The servo gain can be shown to be independent of H as follows:

$$\left| \frac{d\hat{i}_0}{dH} \right| = -|\hat{j}'_0| \sin(H + H_1) \Big|_{H + H_1 = 90°} = 1$$

Trial solution:

$$E = 0, \quad \phi = 0, \quad S_{H_1} = C_{\psi 6} C_{\phi 6}, \quad C_{H_1} = S_{\psi 6} C_{\phi 6}$$

or $$\tan H_1 = \cot \psi_6 = \tan(90 - \psi_6)$$

Therefore, $$H_1 = 90° - \psi_6$$

Therefore, $$H = 90 - H_1 = 90 - (90 - \psi_6) = \psi_6$$

which was expected.

The subject matter of this all-attitude directional reference system and its broad aspects relates to the relationship of a vector to several coordinate axes systems. The subject of multiple coordinates axes system is discussed in text books on mathematics under the general subject of analytic geometry and more particularly to a section thereunder dealing with transformation to coordinates by rotation of axes such transformation being considered either in the subject relating to plane geometry or the subject relating to solid geometry—see for example, "Analytic Geometry" by Curtiss and Moulton, published by D. C. Heath and Company, 1930, wherein section 6 "Rotation of Axes" and section 154 "General Rotation of Axes" consider the subject of rotation of a coordinate axis system. They thereby serve to define multiple coordinate axes systems relationship.

In the present application of the above principles relating to the relationship of multiple coordinate axes system, a vector relative to axes X, Y, Z (the three axes of rotation of an aircraft) which define one coordinate system is evaluated with respect to its position in a second coordinate system. This second coordinate system is defined by a plane generally maintained parallel with the earth's surface and the plane provides two of the coordinate axes of the second axis system and the third coordinate axis is perpendicular to this plane at the intersection of the above two coordinate axes therein.

The position of the vector is defined herein by the spin axis of a yaw-roll gyroscope, and the object is to ascertain the heading of the craft relative to this spin axis vector. Reference is made to a mechanization of the all attitude directional system provided in FIGURE 1 in connection with the following description. Briefly, in FIGURE 1, four rotations of coordinates consisting of two rotations for each axis system followed by a rotation through a space computed heading angle is effective to provide the directional heading of the craft. In FIGURE 1, the all attitude directional reference system 10 comprises a yaw-roll gyroscope 11, an elevation-roll angle gyroscope 30, and a heading angle computer 53. Gyroscope 11 is conventionally referred to as a two-axis gyroscope in that it has two axes of freedom in addition to its freedom to rotate about its spin axis. Gyroscope 11 comprises a rotor 12 rotatable about a spin axis 13 carried in an inner gimbal ring 14. Gimbal ring 14 in turn is mounted for rotation about an axis 15 perpendicular to spin axis 13, in an outer gimbal ring 16. Gimbal 16 in turn is rotatable about an axis defined by trunnion 17, 18, in suitable supporting means 19, 20 on the aircraft. The axis of rotation of gimbal 16 is perpendicular both to the axis 15 and to the axis 13. The rotor spin axis 13 due to inertia in rotor 12 tends to maintain a direction in space. Such direction may be predetermined as for example by slaving the gyroscope 11 conventionally through a flux valve magnetic compass. However, such slaving whereby the gyro is aligned directionally with a magnetic compass is well known in the art and forms no essential part of the present invention.

The present mechaninization utilizes inductive resolvers on the gimbals 14 and 16 of gyroscope 11. A first such resolver 21 is mounted between gimbal 14 involving axis 15 and gimbal 16. Resolver 21 comprises two sets of windings 23, 24 which are relatively rotated by rotation of axis 15 relative to gimbal 16. Winding 23 comprises conventionally two coils set at right angles to one another and winding 24 also comprises two coils set at right angles to one another so that with coil 22 energized from an external source the induced voltage in one coil of winding 24 varies with the cosine of the angle through which axis 15 has been rotated relative to gimbal 16 whereas induced voltage in the other coil is in accordance with the sine of this angle all as well known in the art.

A second resolver 26 comprises windings 27 and 28 is structurally associated with the axis of trunnion 17, 18 and the aircraft mounted support 19, 20. Thus, with a coil 25 energized from an external source relative to the resolver, the voltage generated in one coil of winding 28 varies with the cosine of the angular displacement of the axis of trunnion 17, 18 relative to trunnion support 19, 20 whereas the voltage induced in the other coil of winding 28 varies with the sine of this angle. The angle related to axis 15 is denoted as $\phi_6$ whereas the angle related to the axis of trunnion 17, 18 is referred to as $\psi_6$.

A second gyroscope 30 wherein a rotor has two axes of freedom in addition to freedom about its spin axis is commonly referred to as a vertical gyroscope. It comprises a rotor 31 rotatable about a spin axis 32 supported in an inner gimbal 33. Gimbal 33 in turn is supported on an axis 34 in an outer gimbal 35. Gimbal 35 in turn is supported by trunnions 36, 38 for rotation about a third axis through supporting means 37, 39 on the craft. The gyro rotor 31 thus has angular rotation about three axes, namely two being axes of freedom in motion in addition to rotation about its spin axis.

The spin axis of gyroscope rotor 31 is, as conventional, maintained perpendicular to the earth by suitable erecting means responsive to gravitational sensing means. Since it is old to maintain the spin axis of a vertical gyroscope perpendicular to the earth, the erecting means forms no essentially novel part of the present invention.

Associated with the rotational axis or roll axis for trunnion 36, 38 is a third synchro resolver 40 comprising winding 41 and winding 42. The resolver 40 is so mounted on the craft that upon relative rotation of trunnion 36, 38 relative to the supports 37 and 39, winding 41 will be moved relative to winding 42.

Associated with the craft elevation axis 34 of gyroscope 30 is a fourth resolver 45 comprising windings 46 and 47. These windings are so structurally connected to gimbal 33 at axis 34 and gimbal 35 that upon relative rotation of axis 34 relative to gimbal 35 windings 46 and 47 are relatively rotated.

The heading angle computer 53 comprises a resolver 54, an amplifier 57, a motor 58, a velocity signal generator 60, an output shaft 59, and signal source or indicator 66. Resolver 54 comprises a pair of windings 55 and 56 each comprising two separate coils. The output voltage of one coil of winding 56 is supplied to an A.C. discriminator type amplifier 57 which in turn reversibly controls a motor 58 which may be of the capacitor-induction type. Motor 58 has an output shaft 59 which drives a velocity signal generator 60 in feedback relationship through amplifier 57. A second output shaft 61 of motor 58 which may be geared to output shaft 59 drives resolver winding 55 in a feedback or nulling relationship. The motor shaft 59 may drive an indicator 66 or suitable signal providing means to provide a signal in accordance with the heading of the craft relative to the direction of the spin axis of yaw-roll gyro rotor 12.

For purpose of leveling the spin axis of rotor 12, the output of one coil of synchro winding 47 is supplied through conductor 62 to an amplifier 63. The amplifier may be an A.C. discriminator type old in the art which has its outputs applied to a torque motor 64. Torque motor 64 may be a conventional capacitor type induction motor, and torque motor 64 applies a torque to trunnion 18 to cause a precession of the rotor 12 about axis 15 so that the spin axis 13 of rotor 12 is a direction that is perpendicular to the direction of spin axis 32 of rotor 31.

In the electrical interconnections of the various windings of the resolvers, it should be noted that one coil of resolver winding 24 is connected through suitable impedance matching means 49 and then directly to a coil of synchro resolver winding 41 without going through the resolver 26. This is because the vector identified by the voltage in the particular coil of winding 24 does not have its magnitude affected by the rotation about the angle $\psi_6$ of resolver 26. Similarly, one coil of resolver winding 28 is connected through suitable impedance matching means 51 to a coil of resolver winding 46 since the magnitude of this voltage is not affected by the rotation through the angles $\phi_4$. The same is also true of one coil of synchro resolver winding 42 which in turn is directly coupled through suitable impedance matching means 52 to a coil of synchro winding 55 of synchro resolver 54. Impedance matching means 49, 51 and 52 are such that no phase reversal between the voltage in the coil of resolver winding 24, for example, is altered with respect to the voltage in its related coil of a synchro resolver winding, as winding 41.

Before considering the operation of the device, it will be apparent that the arrangement of FIGURE 1 herein differs from that in a prior arrangement of O. H. Schuck Patent 2,559,094 in that in the present arrangement, the effects of gimbal error such as between the axis of trunnions 17, 18 herein and supports 19, 20 at high bank angles that is wherein the spin axis 13 instead of being at right angles to the axis of trunnion 17, 18 attains an acute angle thereto, are avoided. Such error often called also universal joint error apparently occurs in the arrangement of the prior patent to Schuck.

The operation of the arrangement of FIGURE 1 may be considered vectorially by reference to the block diagram of FIGURE 2. In FIGURE 2, the various elements therein correspond with similarly identified elements in FIGURE 1. It will be noted for example, that the output of one coil of a synchro resolver winding of resolver 21 in FIGURE 2 is directly supplied to a coil in a resolver winding in synchro resolver 40 without passing through resolver 26 and this is to show that it is unaffected by the rotation about or through the angle $\psi_6$.

The vector, as stated, is taken in the direction of the spin axis 13 of gyroscope 11 and its magnitude of one unit is represented by the component vector $j'_0$. This defines one axis system and $k'_0$, $i'_0$ both are of zero magnitude. The rotation through the angle $\theta_6$ does not alter the value V of $j'_0$ and this quantity as shown is supplied to resolver 21 directly. The outputs of resolver 21 comprises $j'_1$ cosine $\phi_6$ and $j'_1$ sine $\phi_6$. The next rotation at resolver 26 will be through the angle $\psi_6$ identified as the angle of rotation about the axis of trunnion 17, 18 of FIGURE 1. It will be clear from analysis that the rotation through this angle does not affect the value of the voltage $j'_1$ sine $\phi_6$ which is parallel to the axis of trunnions 17, 18 therefore it bypasses resolver 26 and is applied directly to resolver 40. On the other hand, the quantity $j'_1$ cosine $\phi_6$ or $j_2$ is modified by the rotation through angle $\psi_6$.

The output of resolver 26 from this input is therefore $j'_1$ cosine $\phi_6$ cosine $\psi_6$ and $j'_1$ cosine $\phi_6$ sine $\psi_6$. It will also be apparent on comparing resolvers 26 and 45 that the vector $j'_1$ cosine $\phi_6$ cosine $\psi_6$ which is an output from resolver 26 is not affected by angle $\phi_4$ and therefore may be applied directly to resolver 45.

Thus, the vector taken equal to $j_0=1$, $i_0=0$, $k_0=0$, and which is represented by the voltage V or $j'_0$ into coil 22 of FIGURE 1 is the directional vector, and it is sought to obtain the direction of the craft longitudinal axis relative to this vector. Since the directional gyro is only a two axis device, and has no capability to sense rotation ($\theta_6$) about its spin axis, the unit vector is chosen in the spin axis ($j'_0$) so that it will be unaffected by rotation $\theta_6$ about this axis.

This vector is resolved into aircraft coordinates through the Euler angles of rotation which are defined by the directional gyro 11 as $\theta_6$, $\phi_6$, and $\psi_6$. This vector is then further resolved back to space ordinates through the Euler angles $\phi_4$ and E of the vertical gyroscope 30. The third rotation through the Euler angle (H) is not defined by the vertical gyro 30 since this represents a rotation about its spin axis 32. Consequently, the third rotation is made through a computed space-reference heading angle (H). The heading angle is obtained by controlling motor 58 so that it rotates resolver winding 55 of resolver 54 until vector $i_0$ shown as output from resolver 54 is reduced to zero.

There has been shown and described what is considered a preferred embodiment of the invention; however, it will be understood that various modifications may be made without departing from the broad scope thereof as defined in the following claims.

I claim:

1. An all-attitude heading reference device for a craft maneuverable about a plurality of its axes, comprising: a directional gyroscope having a rotor rotatably mounted in a frame work; pivotal means comprising a first gimbal supporting said framework about a first axis normal to the rotor axis; mounting means on the craft pivotally supporting said first gimbal about a second axis normal to both the rotor axis and the first axis; a vertical gyroscope having a rotor; a frame supporting said rotor for rotation about a spin axis; a second gimbal pivotally supporting said frame on a third axis normal to the spin axis; bearing means pivotally supporting said second gimbal on a fourth axis normal to both the rotor spin axis and the third axis, a plurality of sine-cosine resolvers, a first resolver being associated with the first axis, a second resolver with the second axis and so forth so that the first, second, third, and fourth axes have a separate resolver associated therewith so that the inductance between sets of windings of each resolver is altered upon rotation about its related axis; means electrically connecting the four resolvers; a fifth resolver; connecting means from the third and fourth resolvers to the fifth resolver; follow up means positioning a winding of the fifth resolver; means controlling said follow up means from the voltage in the winding of said fifth resolver; means for applying a selected voltage to one winding of the first resolver on the directional gyroscope and means driven by said follow up means to show the direction of the craft relative to a datum direction.

2. An all-attitude heading reference device for an aircraft comprising a directional gyroscope having two axes of freedom in addition to its spin axis being normally pointed in a desired direction and a vertical gyroscope having a rotor with axes of freedom about third and fourth axes in addition to its spin axis said vertical gyroscope rotor normally being maintained perpendicular to the earth's surface, in combination: a plurality of sine-cosine resolvers, a first resolver being associated with the first axis of the directional gyroscope, a second resolver with the second axis of the directional gyroscope, a third resolver with the third axis of the vertical gyroscope, and a fourth resolver with the fourth axis of vertical gyroscope with the inductance between sets of windings of each resolver being altered upon rotation about its related axis, means electrically connecting the four resolvers; a fifth resolver on said craft; means connecting an output winding of the fourth resolver to the fifth resolver; means connecting an output winding of the third resolver to the fifth resolver; follow-up means positioning a winding of the fifth resolver; and means controlling said follow up means from the voltage winding of the fifth resolver; and means applying a selected voltage to one winding of the first resolver associated with the first axis of the directional gyroscope.

3. An all-attitude heading reference device having a directional gyroscope with three axes of freedom including the rotor spin axis and a vertical gyroscope having three axes of freedom including the rotor spin axis, in combination: resolver means on the two axes of both gyroscopes other than the spin axis thereof; means electrically connecting said resolvers; means mounting both gyroscopes on an aircraft; means for obtaining the direction of the directional gyro spin axis in the body axes of the aircraft; means for transforming the spin axis vector from the body axes into inertial axes through the Euler angles of the vertical gyroscope on the craft; a heading repeater servomotor; and means controlling said heading repeater servomotor from the resolver means of said vertical gyroscope.

4. In an all-attitude heading reference device, for an aircraft said device comprising a directional gyroscope with a first and a second axis of freedom in addition to its rotor spin axis and a vertical gyroscope having a third and a fourth axis of freedom in addition to its spin axis said directional gyro rotor being slaved to a desired direction and said vertical gyro rotor normally maintained perpendicular to the surface of the earth, in combination: a separate resolver associated with each of said first, second, third, and fourth axes; means for supplying a selected voltage corresponding to $j=1$, $i=0$, $k=0$, representing the directional gyro rotor vector in space coordinates to a first resolver of said directional gyroscope; a second resolver means connected therewith and resolving said vector into aircraft coordinate components; third resolver means on said vertical gyroscope interconnected with said second resolver means; fourth resolver means interconnected with said third resolver means and associated with the fourth axis, said third and fourth resolver means resolving said vector components into space coordinates through the Euler angles of the vertical gyroscope; and torque motor means controlled by said fourth resolver and maintaining the directional gyro spin axis parallel to the surface of the earth.

5. In an all-attitude heading reference device comprising a directional gyroscope having a first and second axis of freedom in addition to its spin axis and a vertical gyroscope having a third and fourth axis of freedom in addition to its spin axis, in combination: inductive means structurally associated with said first, second, third, and fourth axes of rotation and dependent upon the law of sine-cosine; and nulling means electrically associated with said inductive means structurally associated with said third and fourth axes, for obtaining the direction sensed by the rotor of said directional gyroscope in a plane parallel to the earth's surface.

6. In an all-attitude heading reference device, in combination: a directional gyroscope having a rotor mounted in a universal support, comprising an inner gimbal and an outer gimbal normally vertically arranged, the rotor thus being mounted for movement about two axes other than its spin axis; a pivotal mounting for said outer gimbal; a first inductive means mounted between the inner gimbal and outer gimbal and a second inductive means mounted between the outer gimbal and said supporting means; means for applying a selected voltage to the first named inductive means; means electrically connecting said first and second inductive means; a vertical gyroscope having a rotor with freedom about a third and fourth axis in addition to its spin axis; inductive means associated with said third and fourth axes; means connecting said second inductive means of said directional gyroscope to an inductive means of the third axis of said vertical gyroscope; means connecting said inductive means of the third axis with the inductive means of the fourth axis; torque means on said directional gyroscope; and means controlling said torque means from the inductive means of said fourth axis for maintaining the gyro spin axis in a desired plane.

7. In combination: a directional gyroscope having a rotor tiltable about one axis and rotatable about a second axis normal to said first axis so that said rotor has freedom about two axes in addition to its spin axis; a vertical gyroscope having a rotor tiltable about two normally horizontal axes normal to each other in addition to its rotation about its spin axis; and means including resolvers controlled by the angular movement of the direction gyroscope about said two axes other than its spin axis and the tilting of the vertical gyro rotor about its two axes other than its spin axis for governing the position of the spin axis of said directional gyro rotor.

8. A directional system for a dirigible craft comprising, a directional gyro; a first voltage transmitting means controlled by said gyro and providing a plurality of electrical signals responsive to the direction of craft relative to a desired direction; a vertical gyroscope; a second voltage transmitting means connected to said first voltage transmitting means and controlled by the tilt of the craft about its roll and pitch axes; and follow up means operating said second voltage transmitting means and controlled by said second voltage transmitting means for providing a signal in accordance with the heading of the craft.

9. A directional system for a dirigible craft, comprising: a directional gyroscope; a first voltage transmission means controlled by said gyroscope and providing an electrical signal responsive to the direction of the craft relative to a desired direction; a vertical gyroscope; a second voltage transmission means connected to said first voltage transmission means; means operating said second voltage transmission means in accordance with the tilt of the craft about its roll and pitch axes; and a follow up means for said second voltage transmission means controlled by said second voltage transmission means and providing a signal in accordance with the heading of the craft.

10. A directional system for a dirigible craft comprising: a directional gyroscope having a rotor pivotally supported about a first and a second axis other than its spin axis; first voltage transmitting means responsive to pivotal movement about both axes and providing an electrical signal; a vertical gyroscope having a rotor pivotally supported for rotation about two axes normal to its spin axis; second voltage transmitting means connected to said first voltage transmitting means and controlled by the tilt of the craft about its roll and pitch axes; and means computing a space referenced heading angle comprising a follow up system controlled by said second voltage transmitting means and providing a signal in accordance with said heading angle.

11. The apparatus of claim 10; and further means controlled by said second voltage transmitting means and precessing said directional gyroscope to maintain its rotor spin axis parallel to the plane of the rotor of the vertical gyroscope.

12. A directional system for an aircraft rotatable about its normally vertical, roll, and lateral axes, comprising: a directional gyroscope having a rotor tiltable about a first axis and rotatable about a second axis both axes being normal to each other and normal to the spin axis of the rotor of said gyroscope; a vertical gyroscope having a rotor tiltable about a third and a fourth axis, said third and fourth axes being respectively perpendicular and perpendicular to the spin axis of the rotor of the vertical gyroscope; signal transmitting means connected to both gyroscopes and responsive to angular movement about the first, second, third, and fourth axes; and means for energizing said signal transmitting means with a signal of selected magnitude.

13. The apparatus of claim 12, torque means for said directional gyroscope for precessing the direction of the rotor spin axis; and means controlled by said signal transmitting means energizing said torque means.

14. The apparatus of claim 12, an amplifier controlled by said signal transmitting means; a motor responsive to said amplifier; a means driven by said motor and operating said signal transmitting means and providing an output in accordance with the heading angle of the craft.

15. A directional system for a dirigible craft comprising, a directional gyroscope, a voltage transmitting and modifying means; a vertical gyroscope; means for operating said voltage transmitting means in accordance with the angular displacement of the directional gyroscope about two of its axes; means additionally operating said voltage transmitting means in accordance with the angular movement of the vertical gyroscope about two of its axes; and voltage responsive means energized by said voltage transmitting means providing an output in accordance with the heading of the craft relative to a desired direction.

16. In a directional system for a dirigible craft, in combination: a directional gyroscope having a rotor tiltable about an axis and rotatable about a second axis normal to the first axis both axes being perpendicular to the spin axis of the rotor; voltage transmission and modifying mean, including inertial means responsive to angular movement about two axes, responsive to angular movement about both first and second directional gyroscope axes; means providing an input voltage to said voltage transmission and modifying means; and further means controlled by said voltage transmission and modifying means providing a signal in accordance with heading of the craft.

17. In a directional system for a dirigible craft, in combination: a vertical gyroscope having a rotor tiltable about two respectively perpendicular axes both normal to the spin axis of said rotor, said rotor being normally maintained perpendicular to the surface of the earth; inertial means responsive to change in direction of the craft longitudinal axis; voltage transmission and modifying means responsive to angular movement about the two axes of the vertical gyroscope and to the inertial means; means for energizing said voltage transmission and modifying means in accordance with the magnitude of a selected voltage; and further means controlled by said voltage transmission and modifying means in accordance with the heading of the craft.

18. In a dirigible craft having a lateral axis and attaining extreme bank and pitch attitudes in combination:
 a directional system comprising two gyroscopes, one defining one coordinate axis system the other defining a second coordinate axis system, one gyroscope being a vertical gyroscope having only three axes of freedom, one being the rotor spin axis, and arranged for having the rotor tiltable about a second axis parallel to the lateral axis of the craft in accordance with a change in angular position of the craft about the lateral axis;
 voltage transmission and modifying means responsive to movement of the vertical gyroscope about said axis parallel to the lateral axis;
 a directional gyroscope constituting the other gyroscope of the system and having only three axes of freedom, one being the rotor spin axis; and
 means applying to said voltage transmission and modifying means a voltage in accordance with the angle between the direction of said directional gyro rotor spin axis and a selected direction.

(References on following page)

References Cited by the Examiner

UNITED STATES PATENTS

| | | | |
|---|---|---|---|
| 2,412,614 | 12/1946 | Haskins et al. | 74—5.34 X |
| 2,559,094 | 7/1951 | Schuck | 74—5.34 |
| 2,597,151 | 5/1952 | Konet | 74—5.47 X |
| 2,879,669 | 3/1959 | Statsinger | 74—5.4 X |
| 2,879,670 | 3/1959 | Ambrose et al. | 74—5.34 |
| 2,900,824 | 8/1959 | Barnes | 74—5.34 |
| 2,968,956 | 1/1961 | Agins | 74—5.9 |
| 2,973,651 | 3/1961 | Swarts et al. | 74—5.41 |
| 3,069,912 | 12/1962 | Faux et al. | 74—5.34 |
| 3,071,977 | 1/1963 | Ten Bosch et al. | 74—5.34 |

MILTON KAUFMAN, *Primary Examiner.*

BROUGHTON G. DURHAM, *Examiner.*

T. E. W. SHEAR, *Assistant Examiner.*